United States Patent
Lee et al.

(10) Patent No.: US 9,718,006 B2
(45) Date of Patent: Aug. 1, 2017

(54) MULTI-ZONED SCREENING APPARATUS

(71) Applicants: Lee Tech LLC, SanJose, CA (US); ICM, Inc., Colwich, KS (US); Suzhou United Machine Co., Ltd., Suzhou (CN)

(72) Inventors: Chie Ying Lee, San Jose, CA (US); Scott Dennis Kohl, Wichita, KS (US); Ren Jianmin, Suzhou (CN)

(73) Assignees: Lee Tech, LLC, San Jose, CA (US); ICM, Inc., Colwich, KS (US); Suzhou United Machine Co., Ltd., Suzhou (CN)

( * ) Notice: Subject to any disclaimer, the term of this patent is extended or adjusted under 35 U.S.C. 154(b) by 0 days.

(21) Appl. No.: 14/421,323

(22) PCT Filed: Aug. 13, 2013

(86) PCT No.: PCT/US2013/054695
§ 371 (c)(1),
(2) Date: Feb. 12, 2015

(87) PCT Pub. No.: WO2014/028466
PCT Pub. Date: Feb. 20, 2014

(65) Prior Publication Data
US 2015/0231535 A1    Aug. 20, 2015

Related U.S. Application Data

(60) Provisional application No. 61/682,543, filed on Aug. 13, 2012.

(51) Int. Cl.
*B01D 29/90* (2006.01)
*B01D 29/11* (2006.01)
(Continued)

(52) U.S. Cl.
CPC ............ *B01D 29/90* (2013.01); *B01D 29/118* (2013.01); *B01D 35/28* (2013.01); *B07B 1/20* (2013.01); *B30B 9/12* (2013.01); *B30B 9/121* (2013.01)

(58) Field of Classification Search
CPC .... B01D 25/36; B01D 29/74; B01D 33/0083; B01D 33/56; B01D 36/045;
(Continued)

(56) References Cited

U.S. PATENT DOCUMENTS 985,862 A    3/1911  Turner et al.
1,589,097 A    6/1926  Behr
(Continued)

FOREIGN PATENT DOCUMENTS

DE    10143428 A1    3/2003
WO    2012075481 A1    6/2012
WO    2012129500 A2    9/2012

OTHER PUBLICATIONS

European Patent Office, International Preliminary Report on Patentability issued in corresponding International Patent Application No. PCT/US2013/054695 issued Feb. 17, 2015.
(Continued)

*Primary Examiner* — Krishnan S Menon
*Assistant Examiner* — Liam Royce
(74) *Attorney, Agent, or Firm* — Wood Herron & Evans LLP (57) ABSTRACT

A multi-zoned screening apparatus is disclosed for separating fiber from a liquid medium during, for example, a grain wet mill or dry grind process. The apparatus can include a housing having a first and second zone and situated adjacent one another along a length of the housing. A cylindrical screen having a plurality of openings is situated lengthwise within the housing to correspond with the first and second zones. A conveyor is situated lengthwise within the screen
(Continued)

US 9,718,006 B2

Page 2 and includes an elongated shaft having a first and second conveyor section and along a length of the conveyor that corresponds with the first and second zones, respectively. Each conveyor section is configured to move material in a direction along a length of the screen. In one example, the first conveyor section includes vanes and a ribbon flight helically winding about the vanes, and the second conveyor section includes a plurality of paddles.

24 Claims, 6 Drawing Sheets

(51) Int. Cl.
  *B30B 9/12* (2006.01)
  *B07B 1/20* (2006.01)
  *B01D 35/28* (2006.01)

(58) Field of Classification Search
  CPC .............. B01D 33/0009; B01D 33/06; B01D 29/0025; B01D 35/28; B01D 29/118; B01D 29/90; B02B 1/06; C08B 30/044; Y02E 50/17; B07B 1/20; D21D 5/026; B04B 1/20; B30B 9/12; B30B 9/121; B30B 9/26
  USPC ............ 162/55; 209/268; 210/403, 404, 415
  See application file for complete search history.

(56) References Cited

U.S. PATENT DOCUMENTS

| | | | |
|---|---|---|---|
| 1,829,563 A | 10/1931 | Lang | |
| 2,607,679 A | 8/1952 | Weiss et al. | |
| 2,973,866 A * | 3/1961 | Genter | B01D 21/0045 210/519 |
| 3,235,087 A | 2/1966 | Andrews et al. | |
| 3,684,098 A | 8/1972 | Bentley et al. | |
| 4,699,324 A | 10/1987 | Ahs | |
| 4,911,828 A | 3/1990 | Musselmann et al. | |
| 4,913,806 A | 4/1990 | Hillstrom et al. | |
| 4,997,578 A * | 3/1991 | Berggren | B30B 9/163 100/117 |
| 5,051,168 A * | 9/1991 | Hautala | B01D 29/115 162/261 |
| 5,833,851 A * | 11/1998 | Adams | B01D 29/118 100/37 |
| 5,858,228 A | 1/1999 | Turchetti | |
| 2010/0012596 A1 | 1/2010 | Lee | |
| 2010/0237023 A1 | 9/2010 | Sprague | |
| 2013/0334108 A1* | 12/2013 | Tunnicliffe | B07B 1/20 209/240 |

OTHER PUBLICATIONS

European Patent Office, International Search Report and Written Opinion issued in corresponding International Patent Application No. PCT/US2013/054695 mailed Nov. 22, 2013.

Chinese Patent Office, Office Action issued in corresponding Chinese Patent Application No. 2013800521021, dated May 5, 2016, 20 pages.

Chinese Patent Office, Office Action issued in corresponding Chinese Patent Application No. 2013800521021, dated Jan. 22, 2017, 15 pages.

* cited by examiner

MULTI-ZONED SCREENING APPARATUS

TECHNICAL FIELD

The invention relates generally to separating material from a liquid medium and, more particularly, to an apparatus and method for separating fiber from a slurry or other liquid medium.

BACKGROUND

A wide range of industrial applications require a bulk material to be separated or isolated into several constituent parts through, for example, some type of filtration process utilizing a liquid medium. Once filtered, the separated constituent, and/or the remainder of the bulk material and liquid medium, may be further processed so as to result in one or more desired products. By way of example, various methods of producing alcohol from grain may require that the fibrous constituent of the grain be separated from the starch and/or other constituents of the grain. A corn wet milling process, for example, separates the fiber from the starch in corn and subsequently uses the starch to produce ethanol, which may be used in automobiles or other motor vehicles. A dry grind milling process, for example, also separates its fiber, or insoluble solids ("wet cake"), from the liquid or "thin stillage" from the residuals, i.e., "whole stillage", produced from distillation. Such fiber is subsequently used to produce Distillers Wet Grain with Soluble (DWGS) or Distillers Dried Grain with Soluble (DDGS). Filtration processes that separate a constituent from a liquid medium involve a step in other industrial applications as well. In this regard, the pulp and paper industry often requires the separation of fiber from a fibrous bulk material. Such filtration processes also exist in the textile manufacturing industry, the chemical industry (e.g., crystal formation applications), and other fields.

In a corn wet mill process, for example, to facilitate separation of the various constituents of the corn, the corn is mixed with water to form a slurry having a relatively high percentage of water (e.g., 80% or higher). The fiber is then filtered from the slurry, which in addition to the water, contains, for example, starch and gluten constituents of the corn, and the slurry is further processed to produce ethanol. In the corn wet mill process, conventional devices for filtering the fiber from the starch-containing slurry may include pressure screen devices and paddle screen devices.

Pressure screen devices direct the slurry to flow through a static screen under relatively low fluid pressure. The screen includes openings sufficiently sized so as to permit the water, starch and gluten (any other constituents smaller than the openings) to flow through the screen, but prevent the fiber from flowing therethrough, thus essentially filtering the fiber from the slurry. Paddle screen devices include rotating paddles with a stationary drum including an outer wall configured as a screen. The rotation of the paddles directs the slurry toward the screened outer wall and essentially presses the slurry so as to force the water, the starch and the gluten through the screen while preventing the fiber from passing therethrough. The movement of the paddles relative to the drum loosens the fiber from the outer wall and reduces plugging of the screen openings. Also, the centrifugal force created by the rotating paddles provides a higher filtration pressure as compared to the pressure screens. This higher pressure gives a higher capacity per unit screen surface but larger sized particles can be forced through the screen in the paddle screen devices.

After initially filtering the fiber from the slurry, some of the starch and/or the gluten may still be associated with the fiber. Thus, it may be desirable to wash the fiber and remove additional amounts of starch and/or gluten therefrom. In this regard, the fiber is typically mixed with a liquid medium, such as wash water, and directed back through a pressure screen or a paddle screen device to separate the fiber from the wash water, which contains the additional starch and/or gluten washed from the fiber. Conventional systems may include multiple washing stages to remove the starch and/or gluten from the fiber. For example, processing systems utilizing pressure or paddle screen devices typically include six or seven such stages. These various stages typically include separate, dedicated devices to facilitate washing of the fiber with wash water, which is then directed to a pressure screen or paddle screen device for filtration of the fiber therefrom. In addition, subsequent to washing, the fiber may be, or need to be, de-watered, which can require yet another device.

Although such systems operate for their intended purpose, these systems have several drawbacks. For example, the washing of the fiber in these systems is typically inefficient, therefore requiring a relatively large number of stages. This, in turn, increases the cost of the systems due to the large number of devices required (i.e., washing devices and/or pressure/paddle screen devices for filtration) and associated tanks, pumps and control loops. These large, multiple-step systems represent significant capital and/or operating costs, as well as high maintenance costs for those devices. Additionally, the relatively large number of stages also requires a significant amount of floor space in a manufacturing facility, which may be at a premium in various industrial applications. Furthermore, the above systems are prone to screen blinding and significant down time. For example, pressure screen systems generally require a high pressure washing about every eight hours of operation so as to function adequately.

Accordingly, there is a need for an improved apparatus and method for separating material, such as fiber, from a slurry or other liquid medium in a more efficient manner.

SUMMARY

The present invention is directed to an apparatus and method for separating fiber from a slurry or other liquid medium during, for example, a grain wet mill or a dry grind process.

In one embodiment, multi-zoned screening apparatus includes an elongated housing having at least a first zone and a second zone situated adjacent one another along a length of the housing. An elongated cylindrical screen having a plurality of openings is situated lengthwise within the housing so as to generally correspond with the first and second zones. Each of the first and second zones is configured to collect liquid medium that passes through the plurality of openings. A conveyor is situated lengthwise within the screen and includes an elongated shaft having at least a first conveyor section and a second conveyor section along a length of the conveyor that generally corresponds with the first and second zones of the housing, respectively. Each conveyor section is configured to move material in a direction along a length of the screen. A liquid inlet is in fluid communication with an interior of the screen to optionally supply wash water to the multi-zoned screening apparatus. At least one feed inlet is in fluid communication with an interior of the screen that corresponds with the first zone of the housing to supply the liquid medium and the material to the multi-zoned screening apparatus. The apparatus further includes a discharge chute that collects filtered material from the multi-zoned screening apparatus.

In another embodiment, the multi-zoned screening apparatus includes an elongated housing having at least a first zone and a second zone situated adjacent one another along a length of the housing. An elongated cylindrical screen having a plurality of openings is situated lengthwise within the housing so as to generally correspond with the first and second zones. Each of the first and second zones is configured to collect liquid medium that passes through the plurality of openings. A conveyor is situated lengthwise within the screen and includes an elongated shaft having at least a first conveyor section and a second conveyor section along a length of the conveyor that generally corresponds with the first and second zones of the housing, respectively. The first conveyor section is different than the second conveyor section and each conveyor section is configured to move material in a direction along a length of the screen. At least one feed inlet is in fluid communication with an interior of the screen that corresponds with the first zone of the housing to supply the liquid medium and the material to the multi-zoned screening apparatus. The apparatus further includes a discharge chute that collects filtered material from the multi-zoned screening apparatus.

In one example, the first conveyor section of the elongated shaft includes a plurality of vanes and a ribbon flight helically winding about a length of an outer surface of the vanes, and the second conveyor section of the elongated shaft includes a plurality of paddles. In another example, the first conveyor section of the elongated shaft includes a plurality of paddles, and the second conveyor section of the elongated shaft includes a plurality of vanes and a ribbon flight helically winding about a length of an outer surface of the vanes. In another example, each of the first conveyor section and the second conveyor section of the elongated shaft includes a plurality of paddles. In yet another example, each of the first conveyor section and the second conveyor section of the elongated shaft includes a plurality of vanes and a ribbon flight helically winding about a length of an outer surface of the vanes.

BRIEF DESCRIPTION OF THE DRAWINGS

The accompanying drawings, which are incorporated in and constitute a part of this specification, illustrate embodiments of the invention and, with a detailed description of the embodiments given below, serve to explain the principles of the invention.

DETAILED DESCRIPTION OF SPECIFIC EMBODIMENTS

Virtually all of the fuel ethanol in the United States is produced from a wet mill process or a dry grind ethanol process. Although generally any type and quality of grain can be used to produce ethanol, the feedstock for these processes may be a corn known as "No. 2 Yellow Dent Corn." The "No. 2" refers to a quality of corn having certain characteristics as defined by the National Grain Inspection Association, as is known in the art. "Yellow Dent" refers to a specific type of corn as is known in the art. Sorghum grain is also utilized to a very small extent. Generally speaking, the current industry average for ethanol yield for both dry grind and wet mill plants is approximately 10.2 liters (approximately 2.7 gal) of ethanol produced per 25.4 kg (one (1) bushel) of No. 2 Yellow Dent Corn.

Figure 1:
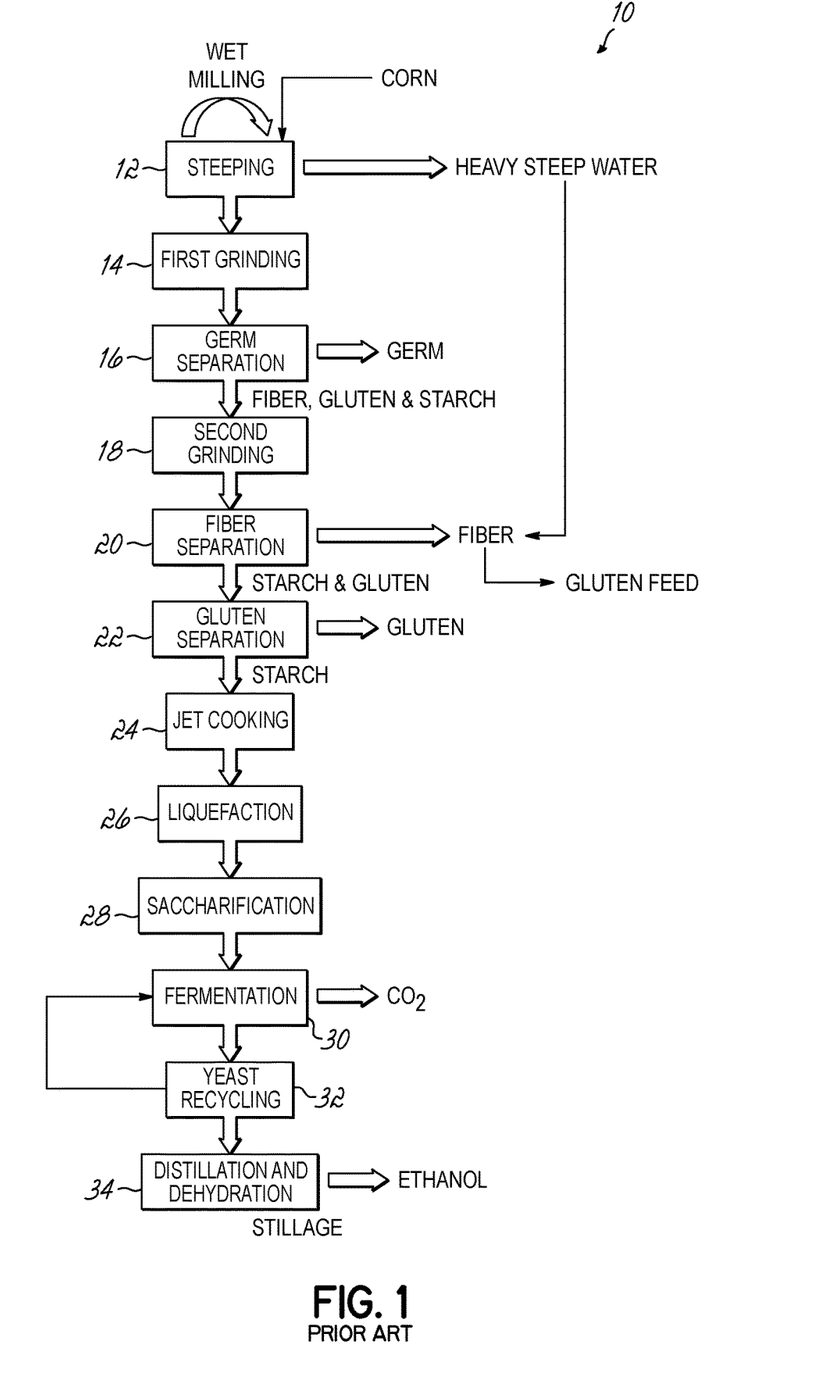
FIG. 1 is a flowchart illustrating a corn wet mill process for producing ethanol.

Corn wet mill processing plants convert corn grain into several different co-products, such as germ (for oil extraction), gluten feed (high fiber animal feed), gluten meal (high protein animal feed), and starch-based products such as ethanol, high fructose corn syrup, or food and industrial starch. FIG. 1 is a flow diagram of a wet milling ethanol production process 10. The process 10 begins with a steeping step 12 in which the corn is soaked for 24 to 48 hours in a solution of water and sulfur dioxide in order to soften the kernels for grinding, leach soluble components into the steep water, and loosen the protein matrix with the endosperm. The mixture of steeped corn and water is then fed to a degermination mill step (first grinding) 14 in which the corn is ground in a manner that tears open the kernels and releases the germ. This is followed by a germ separation step 16 that occurs by flotation and use of a hydrocyclone.

The remaining slurry, which is now devoid of germ, but containing fiber, gluten (i.e., protein) and starch, is then subjected to a fine grinding step (second grinding) 18 in which there is total disruption of endosperm and release of endosperm components, namely gluten and starch, from the fiber. This is followed by a fiber separation step 20 in which the slurry is passed through a series of screens in order to separate the fiber from starch and gluten, and to wash the fiber clean of gluten and starch. This is followed by a gluten separation step 22 in which centrifugation and/or hydrocyclones separate starch from the gluten.

The resulting purified starch co-product then undergoes a jet cooking step 24 to gelatinize (solubilize) the starch. Jet cooking refers to a cooking process performed at elevated temperatures and pressures, although the specific temperatures and pressures can vary widely. Typically, jet cooking occurs at a temperature of about 120 to 150° C. (about 248 to 302° F.) and a pressure of about 8.4 to 10.5 kg/cm$^2$ (about 120 to 150 lbs/in$^2$), although the temperature can be as low as about 104 to 107° C. (about 220 to 225° F.) when pressures of about 8.4 kg/cm$^2$ (about 120 lbs/in$^2$) are used. This is in contrast to a non-jet cooking process, which refers to a process in which the temperature is less than the boiling point, such as about 90 to 95° C. (about 194 to 203° F.) or lower, down to about 80° C. (176° F.). At these lower temperatures, ambient pressure would be used.

This is followed by a liquefaction (amylolysis) step 26 at which point alpha-amylase may be added. Liquefaction occurs as the mixture, or "mash" is held at 90 to 95° C. (194 to 203° F.) in order for alpha-amylase to hydrolyze the gelatinized starch into maltodextrins and oligosaccharides (chains of glucose sugar molecules) to produce a liquefied mash or slurry. This is followed by separate saccharification and fermentation steps, 28 and 30, respectively. In the saccharification step 28, the liquefied mash is cooled to about 50° C. (122° F.) and an enzyme such as glucoamylase is added. The glucoamylase hydrolyzes the maltodextrins and short-chained oligosaccharides into single glucose sugar molecules to produce a liquefied mash. In the fermentation step 30, a common strain of yeast (*Saccharomyces cerevisae*) is added to metabolize the glucose sugars into ethanol and $CO_2$. Saccharification can take as long as about 50 to 60 hours. Upon completion, the fermentation mash ("beer") will contain about 17% to 18% ethanol (volume/volume basis), plus soluble and insoluble solids from all the remaining grain components. Yeast can optionally be recycled in a yeast recycling step 32. In some instances, the $CO_2$ is recovered and sold as a commodity product.

Subsequent to the fermentation step 30 is a distillation and dehydration step 34 in which the beer is pumped into distillation columns where it is boiled to vaporize the ethanol. The ethanol vapor is condensed in the distillation columns, and liquid alcohol (in this instance, ethanol) exits the top of the distillation columns at about 95% purity (190 proof). The 190 proof ethanol then goes through a molecular sieve dehydration column, which removes the remaining residual water from the ethanol, to yield a final product of essentially 100% ethanol (199.5 proof). This anhydrous ethanol is now ready to be used for motor fuel purposes. The "stillage" produced after distillation and dehydration 34 in the wet mill process 10 is often referred to as "whole stillage." Other wet mill producers, however, may refer to this type of stillage as "thin stillage." It will be understood by one having ordinary skill in the art that the above general process may be manipulated and modified as desired.

Figure 2:
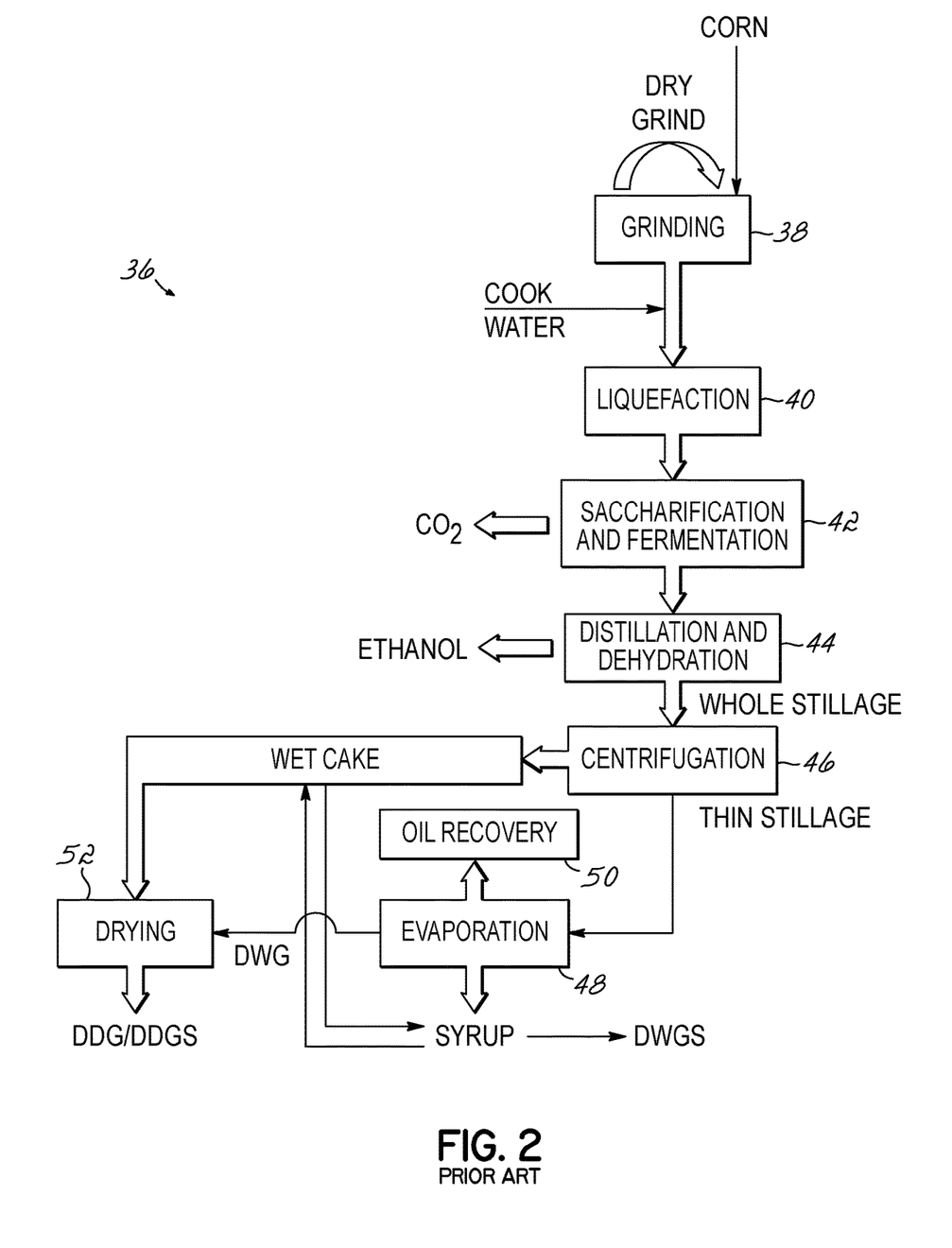
FIG. 2 is a flowchart illustrating a dry grind mill process for producing ethanol.

With respect to the dry grind process, FIG. 2 is a flow diagram of a typical dry grind ethanol production process 36. The part of the process 36 that occurs prior to distillation and dehydration 44 may be referred to as the "front end", and the part of the process 36 that occurs after distillation and dehydration 44 (hereinafter "dehydration") may be referred to as the "back end". To that end, the front end of the process 36 begins with a grinding step 38 in which dried whole corn kernels are passed through hammer mills for grinding into meal or a fine powder. The screen openings in the hammer mills typically are of a size 7/64, or about 2.78 mm, with the resulting particle distribution yielding a very wide spread, bell type curve, which includes particle sizes as small as 45 micron (0.045 mm) and as large as 2 to 3 mm.

The grinding step 38 is followed by a liquefaction step 40 whereat the ground meal is mixed with cook water to create a slurry and an enzyme such as alpha-amylase is typically added (not shown). The pH is adjusted here to about 5.0 to 6.0 and the temperature maintained between about 50° C. to 105° C. (122 to 221° F.) to convert the insoluble starch in the slurry to soluble starch. The stream after the liquefaction step 40 has about 26 to 38% dry solids (DS) content with all the components contained in the corn kernels, including sugars, protein, fiber, starch, germ, grit, and oil and salts, for example. There generally are three types of insoluble solid particles in the liquefaction stream: fiber, germ, and grit, with all three solids having about the same particle size distribution.

The liquefaction step 40 is followed by a simultaneous saccharification and fermentation step 42. This simultaneous step is referred to in the industry as "Simultaneous Saccharification and Fermentation" (SSF). In some commercial dry grind ethanol processes, saccharification and fermentation occur separately (not shown). Both individual saccharification and SSF can take as long as about 50 to 60 hours. Fermentation converts the sugar to alcohol using a fermentor. Subsequent to the saccharification and fermentation step 42 is the distillation (and dehydration) step 44, which utilizes a still to recover the alcohol.

Finally, the back end of the process 36, which follows distillation (and dehydration) step 44, includes a centrifugation step 46, which involves centrifuging the residuals, i.e., "whole stillage", produced with the distillation step (and dehydration) step 44 to separate the insoluble solids ("wet cake") from the liquid ("thin stillage"). The "wet cake" includes fiber, of which there are three types: (1) pericarp, with average particle sizes typically about 1 mm to 3 mm; (2) tricap, with average particle sizes about 500 micron (0.5 mm); (3) and fine fiber, with average particle sizes of about 250 micron (0.25 mm). The liquid from the centrifuge contains about 6% to 8% DS.

The thin stillage enters evaporators in an evaporation step 48 to boil away water, leaving a thick syrup that contains the soluble (dissolved), fine suspended (generally less than 50 um) and buoyant suspended solids from fermentation (25% to 40% dry solids). The concentrated slurry may be subjected to an optional oil recovery step 50 whereat the slurry can be centrifuged to separate oil from the syrup. The oil can be sold as a separate high value product. The oil yield is normally about 0.4 lb./bu (0.18 kg/bu) of corn with high free fatty acids content. This oil yield recovers only about ¼ of the oil in the corn. About one-half of the oil inside the corn kernel remains inside the germ after the distillation step 44, which cannot be separated in the typical dry grind process using centrifuges. The free fatty acids content, which is created when the oil is held in the fermenter for approximately 50 hours, reduces the value of the oil. The (de-oil) centrifuge step 50 only removes less than 50% of oil present in thick syrup because the protein and oil make an emulsion, which cannot be satisfactorily separated by centrifugation alone as practiced today.

The centrifuged wet cake and the de-oiled syrup, which still has more than 10% (dry matter concentration) oil, can be mixed and the mixture may be sold to beef and dairy feedlots as Distillers Wet Grain with Soluble (DWGS). Alternatively, the syrup can be mixed with the wet cake, then the concentrated syrup mixture may be dried in a drying step 52 and sold as Distillers Dried Grain with Soluble (DDGS) to dairy and beef feedlots. This DDGS has all the protein and 75% of the oil in corn. But the value of DDGS is low due to the high percentage of fiber, and in some cases the oil is a hindrance to animal digestion. It will be understood by one having ordinary skill in the art that the above general dry grind process may be manipulated and modified as desired.

Figure 3:
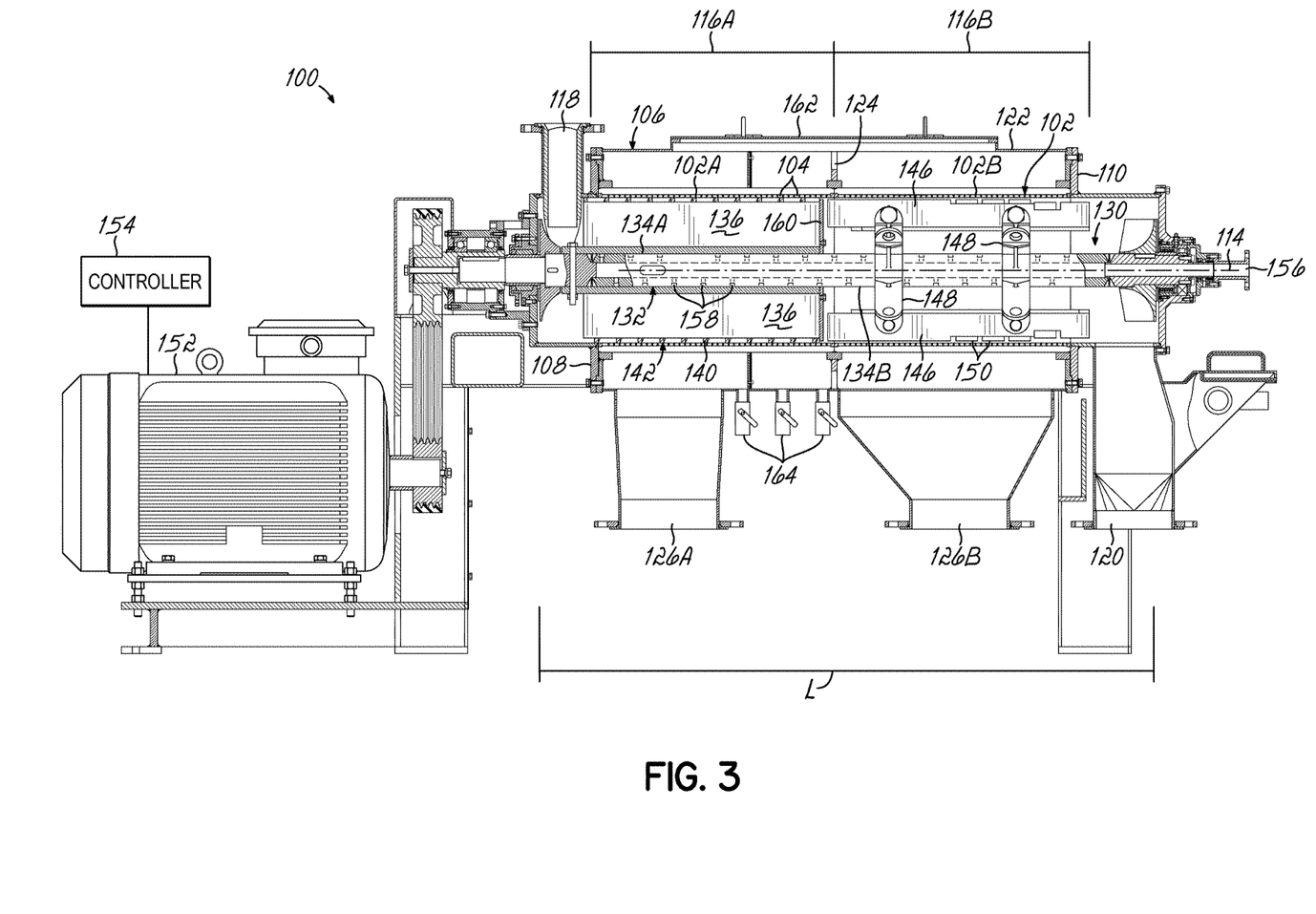
FIG. 3 is a cross-sectional view of a multi-zoned screening apparatus in accordance with an embodiment of the invention.

The corn wet milling process 10, as described above in FIG. 1, includes a fiber separation step 20 wherein fiber is filtered or separated from the slurry. Similarly, the dry grind process 36, as described above in FIG. 2, includes a centrifugation step 46 wherein fiber similarly is filtered or separated from the slurry. In accordance with an embodiment of the invention, FIG. 3 shows an apparatus 100 for achieving separation, washing, and de-watering of the fiber from the slurry, which may be incorporated into the fiber separation step 20 of the corn wet mill process 10 or the centrifugation step 46 of the dry grind process 36. Other locations for the apparatus 100 in either process 10, 36 for accomplishing the same are contemplated as well. In addition, the apparatus 100 may be utilized at various locations in other types of ethanol production processes to separate material from liquid medium, including, for example, in the methods disclosed in WO 2012/075481, filed Dec. 5, 2011, and WO 2012/129500, filed Mar. 23, 2012, the contents of which are incorporated herein by reference in their entirety.

With reference now to FIG. 3, the apparatus 100 is a single, self-contained device configured for pre-washing and separating, i.e., filtering, a material, e.g., fiber, from a liquid medium, then further washing/de-watering the material. With respect to the wet milling process, for example, the apparatus 100 can perform both the initial filtering of the slurry and pre-washing of the fiber to clean the fiber and to remove starch/gluten that is associated with the fiber, as well as washing/dewatering of the fiber. With respect to the dry milling process, the apparatus 100 also can perform both an initial filtering and pre-washing of the fiber to clean the fiber and to remove the thin stillage that is associated with the fiber, as well as washing/dewatering of the fiber.

The apparatus 100, as shown in FIG. 3, includes a stationary, cylindrical-shaped screen 102 having a plurality of openings 104 formed therein to permit the liquid medium, including any wash water and any starch and/or gluten and/or fine suspended particles (including yeast from fermentation) washed off the fiber, for example, to pass through the screen 102 while preventing the coarser fiber from passing therethrough. The screen 102 is disposed in an interior of an elongated housing 106, which includes a first end wall 108 and a second end wall 110. The screen 102 is situated about a central axis 114 of the apparatus 100 and extends substantially along the length (L) thereof.

Although a single or a unitary elongated screen may be utilized here, the screen 102 in FIG. 3 is shown having individual first and second screen sections 102A and 102B, which are situated adjacent one another along a length of the screen so as to generally correspond respectively with first and second zones 116A and 116B of the housing 106. The first screen section 102A is situated proximate a tangential feed inlet 118 located at one end of the apparatus 100 adjacent the first zone 116A to receive the incoming material and liquid medium and extends partly along the length (L) of the apparatus 100 to about a midway point thereof. The second screen section 102B is situated adjacent the first screen section 102A at about the midway point and extends partly along the remainder of the length (L) of the apparatus 100 to proximate a fiber discharge chute 120, which is situated at an opposing end of the apparatus 100 adjacent the second zone 116B.

It is noted that the lengths of the first and second screen sections 102A, 102B may vary but, due to the overall length thereof, a large volume of liquid medium and material can be processed while still producing a desirably dry material. For example, the first or second screen section 102A, 102B may extend less than or more than about the midway point of the apparatus 100. Also, while only two screen sections 102A, 102B are used here, it is understood that more than two screen sections 102A, 102B may be utilized. In addition, while the diameter of the screen 102 is shown as being substantially constant along its length, the screen diameter may vary along at least one or more portions thereof. In one example, the apparatus 100 may have a screen length to screen diameter (L/D) ratio greater than 3. In another example, the L/D screen ratio is between approximately 3 and 10, and more preferably between 4 and 6. These values are exemplary and those of ordinary skill in the art will recognize other ratios suitable for a particular application.

The screen 102 may include a wedge wire type with slot opening, or a round hole, thin plate screen. In other embodiments, the screen may be a bar screen, a thin metal screen (e.g., mesh screen), or a filter cloth having a metal reinforced design. Those of ordinary skill in the art will recognize other types of screens that may be used in accordance with embodiments of the invention. The openings 104 in the screen 102 may vary depending on the specific application and on the type of material being filtered. For example, for fiber filtration, it is contemplated that the openings 104 in the first and second screen sections 102A, 102B may be sized from about 10 microns (0.01 mm) to about 1 mm. In another example, the openings 104 may be from about 30 microns to about 500 microns (about 0.03 mm to about 0.5 mm). The openings 104 in the first screen section 102A may be the same size as the openings in second screen section 102B, larger than the openings in the second screen section 102B, or smaller than the openings in the second screen section 102B. Those of ordinary skill in the art will recognize how to determine the size of the openings 104 to achieve the filtration of the desired material. But generally, the screens 102A, 102B can be provided with smaller openings 104 due to the overall length thereof. In certain applications, increasing the length of the screens 102A, 102B allows for smaller openings, which provides for a more desirable dewatering of the materials through the apparatus 100. Smaller openings 104 also can limit the amount of solids passing through the screens 102A, 102B while still providing for desirable recovery of liquid medium and output of dry material, e.g., fiber.

As indicated above, the housing 106 generally surrounds the screen 102 and is adapted to collect the medium that passes through the openings 104 in the screen 102. The housing 106 includes at least one side wall 122 connecting the first and second end walls 108, 110 so as to define the interior. The housing 106 further includes at least one interior panel 124 that compartmentalizes and separates the housing 106 into the first and second zones 116A, 116B, which include first and second hoppers 126A and 126B, respectively, with corresponding outlets to remove the filtered liquid medium and direct the filtered liquid medium to a desired location. The first and second zones 116A, 116B are situated adjacent one another.

The first zone 116A may generally define an initial pre-washing and separation zone, and the second zone 116B may generally define a washing/dewatering zone. The end of the second zone 116B includes the discharge chute 120 where the separated and washed/de-watered fiber material may be collected for further processing. Although two zones 116A, 116B are illustrated here, those of ordinary skill in the art will appreciate that the number of separation zones 116A and the number of washing/dewatering zones 116B may be application specific, i.e., may vary in number as well as in length. For example, the first or second zone 116A, 116B may extend less than or more than about the midway point of the apparatus 100. The housing 106 may have any suitable shape. If more than two zones are desired, e.g., three zones, the housing 106 is simply adapted to include an additional interior panel 124 to further compartmentalize the housing into first and second zones 116A, 116B and a third zone (not shown), which can include first and second hoppers 126A, 126B and a third hopper (not shown), respectively, with corresponding outlets for removing the filtered liquid medium and directing the filtered liquid medium to a desired location. In one example, the interior panel 124 is movable or adjustable, e.g., slidably adjustable, generally along the length (L) of the apparatus so as to vary or control the size of the zones 116A, 116B.

With further reference to the tangential feed inlet 118, the feed inlet 118 is at one end of the apparatus 100 adjacent the first zone 116A and in fluid communication with an interior of the first screen section 102A that corresponds with the first zone 116A of the housing 106. The feed inlet 118 supplies the medium and material, e.g., fiber, to the apparatus 100 and can introduce the medium and material in a swirling fashion (tangential entry along outside wall) to start filtering the fiber upon entry into the apparatus 100.

A conveyor 130 is disposed or situated lengthwise within the screen within the screen 102 for moving the material along the length (L) of the apparatus 100 from the feed inlet 118 towards the discharge chute 120. The conveyor 130 rotates relative to the stationary screen 102 and to the central axis 114 to direct the liquid medium and material toward the screen 102 to filter the material from the liquid medium.

The conveyor 130 includes a rotatable shaft 132 that extends along the length (L) of the apparatus 100 and is situated about the central axis 114. The shaft 132 defines a first conveyor section 134A that generally corresponds with the first zone 116A and includes a plurality of spaced apart vanes 136, which extend generally horizontally along substantially the length of the first zone 116A. The spaced apart vanes 136 also extend in a direction away from the shaft 132 such that an outer edge of each is situated in spaced apart relation to the first screen section 102A so as to provide a gap therebetween to provide a fluid flow passage for the liquid medium (e.g., slurry and/or wash water) during the filtration of the material (e.g., fiber), and can be sized to accommodate the design throughput of the apparatus 100. The space between adjacent vanes 136 also defines an open cavity and similarly provides a fluid flow passage for the liquid medium during the filtration of the material, and likewise can be sized to accommodate the design throughput of the apparatus 100.

The number of vanes 136 can range from about 2 to about 10. In another example, the number of vanes 136 is from about 4 to about 8. In yet another example, the number of vanes 136 is 8. The thickness of the vanes 136 can range from about ¼ inch (0.64 cm) to about 2 inches (5 cm). In another example, the thickness of the vanes 136 can range from about ¼ inch (0.64 cm) to about ½ inch (1.3 cm). The shape and orientation of the vanes 136 may be changed as desired to adjust the flow of the liquid material and medium and the filtering characteristic of the apparatus 100. In one example, the vanes 136 may be oriented in a helical fashion about the length of the first conveyor section 134A of the shaft 132. In another example, the pitch or angle of the vanes 136 relative to the shaft may be adjusted, as well as the spacing between the vanes 136, which can be constant or variable from one vane 136 to the next.

Helically wound about and secured to the outer surfaces of the vanes 136, and occupying an area between the outer surface of the vanes 136 and the first screen section 102A, is at least one ribbon flight 140. The ribbon flight 140, which can be continuous or discontinuous, helically winds substantially about and along the length of the vanes 136, which together define an auger 142 for moving the material and liquid medium radially towards and along the length of the first screen section 102A, and in a direction towards the second screen section 102B and the discharge outlet 120, so as to help pre-wash and separate the material from the medium. The ribbon flight 140 includes an outer edge configured to be located in close proximity to the inner surface of the first screen section 102A. For example, a small gap (on the order of 0.3 mm-2.0 mm) may exist between the outer edge of the ribbon flight 140 and the first screen section 102A so as to accommodate, for example, relative movement therebetween, yet remain effective for keeping the filtration area at the first screen section clean 102A. The thickness of the flight 140 can be from about 1 mm to about 30 mm, but can vary as desired. In another example, the thickness of the flight 140 can be from about 3 mm to about 10 mm. The thickness may vary along the length of the flight 140. The height of the flight 140 can be from about 1 mm to about 5 cm, but can vary as desired. The height may vary along the length of the flight 140.

In one embodiment, the auger 142 may have a multi-flight configuration (e.g., having multiple helical ribbon flights extending along at least a portion of the length thereof), which may enhance the filtering of the material from the liquid medium while preventing the screen 102 from plugging. Those of ordinary skill in the art will recognize other configurations that facilitate the movement of the material through the apparatus 100 to meet the requirements of a particular application, and the invention is not limited to the particular configuration shown in FIG. 3. Another design variable that allows the auger 142 to be configured for specific applications is the pitch of the ribbon flight 140 along the length of the vanes 136. In one embodiment, for example, the pitch may vary along the length.

The shaft 132 of the conveyor 130 further defines a second conveyor section 134B adjacent the first conveyor section 134A and that generally corresponds with the second zone 116B. This second conveyor section 134B includes a plurality of paddles 146 that extend adjacently parallel to the second screen section 102B and generally along the length thereof. Each paddle 146 is connected to the shaft 132 via a plurality of spaced apart support arms 148.

The length of each paddle 146 may be adjusted, as desired. The number of paddles 146 can range from about 2 to about 10. In another example, the number of paddles 146 is from about 2 to about 8. In yet another example, the number of paddles 146 is 8. The paddles 146 help move the material and medium radially towards and along the length of the second screen section 102B, as well as towards the discharge outlet 120, so as to further separate and dry the material. The spacing between the paddles 146 may be constant or variable from one paddle 146 to the next.

Each paddle 146 can optionally include one or more conventional rakes 150, which may define individual triangular segments situated near the ends of the paddles 146. One or more rakes 150 may be angled or configured to help push the fiber towards the discharge chute 120. In one example, the number of rakes 150 can range from about 4 to about 8. The number of rakes 150 and paddles 146 can be modified depending on the amount of solids in the feed, for example. The gap between the screen 102 and paddle 146 can range from about 0.25 to 0.65 inch (0.64 to 1.65 cm). A smaller gap gives a drier cake with higher capacity and purer fiber. A larger gap gives a wetter cake with lower capacity and purer protein stream in slurry passing through screen openings, for example. Those of ordinary skill in the art will recognize other configurations that facilitate the movement of the material through the apparatus 100 to meet the requirements of a particular application, and the invention is not limited to the particular configuration shown in FIG. 3. Also, with additional zones, i.e., more than two zones (not shown), it is contemplated that either the auger 142 or the plurality of paddles 146 connected to the shaft 132 via a plurality of spaced apart support arms 148, or the like, may be provided as desired for additional filtering/separation of the material from the liquid medium. In addition, the desired length of the first and second conveyor sections 134A, 134B can be varied or dependent upon the feed rate of the medium and material and/or the composition thereof.

With further reference to FIG. 3, a motor 152 is operatively coupled to the conveyor 130 for rotation of the shaft 132 about the central axis 114. A controller, shown schematically at 154, can be operatively coupled to the motor 152 for controlling the rotational speed of the conveyor 130, which may be constant or variable. Rotation of the shaft 132 may be achieved by a suitable motor 152 or other motive force-generating device, as understood in the art. For example, one end of the shaft 132 may be operatively coupled to an electric motor, such as via a suitable belt or by direct drive, so as to cause the shaft 132 to rotate about the central axis 114. In one embodiment, the controller 154 may be a computer, which can control the rotational speed of the shaft 132. Such a controller 154 is generally known to those of ordinary skill in the art. The rotational speed of the shaft 132 may be selectively varied depending on the specific application. In one embodiment, the shaft 132 may be rotated at a speed (e.g., revolutions per minute) that can range from about 100 to about 2000 RPM (about 1.67 to about 33.33 hertz). In another example, the speed can range from about 400 to about 1000 RPM (about 6.67 to about 16.67 hertz). In another example, the speed can range from about 500 to about 900 RPM (about 8.33 to about 15 hertz). A higher speed provides higher capacity but consumes more power. Those of ordinary skill in the art will recognize that these values are exemplary and the speeds may be selected and optimized to meet the needs of a particular application.

The shaft 132 of the conveyor 130 further includes an optional liquid inlet 156 that is centrally situated within and extends substantially along the length of the shaft 132. The liquid inlet 156 is adapted to receive wash water therethrough from a desired source. The shaft 132 also has a plurality of liquid outlets 158 associated with the liquid inlet 156 and are spaced apart along substantially the length of the shaft 132 within the first and second zones 116A, 116B for introducing wash water therein. Of course, if additional zones are desired in apparatus 100, the liquid inlet 156 may be configured to provide wash water thereto as well. One or more of the outlets 158 may be controlled or eliminated altogether so as to prevent or reduce the amount of wash water entering into any one zone 116A, 116B. Additionally, a counter current washing technique may be employed to save wash water usage. With the optional addition of wash water to the apparatus 100, displacement can be achieved instead of dilution washing. And as the fiber material dries, wash water may be added thereto, yet, the apparatus 100 still produces a dry material prior to the discharge chute 120.

In one example, the second zone 116B is not subjected to wash water so as to generally define a press/dewatering zone, as compared to a washing/dewatering zone, for dewatering the fiber material. In another example, neither the first nor second zones 116A, 116B receive additional wash water and generally define a first separation or filtration zone and a second press/dewatering zone, respectively, as compared to a pre-wash/separation zone and a washing/dewatering zone. In this example, the filtrate from the filtration zone may have less solids, with more solids consequently being present in the filtrate from press/dewatering zone. In addition, the separated filtrate from the filtration zone can be optionally returned to the feed inlet 118 to ultimately yield a more desirable filtrate and dry fiber. If additional zones are desired in the apparatus 100, various configurations are contemplated. For example, with a three zone apparatus (not shown) where neither the first nor second zones receive additional wash water, a third zone (not shown) may define a washing/dewatering zone, which includes the additional wash water. In a further example, an optional fourth zone (not shown) may be provided, which excludes additional wash water, so as to define another press/dewatering zone.

With reference again to FIG. 3, the conveyor arrangement allows for pre-washing and filtering, as well as gentle (low turbulence) dewatering in the first zone 116A, which can be desirable for avoiding emulsions and forcing oversized particles through the screen 102. The paddles 146 in the second zone 116B do a desirable job of further, more strongly dewatering the fiber to produce a drier fiber for maximum liquid medium recovery from the fiber material. It is anticipated that the fiber material that exits the apparatus via the discharge chute 120 may be between approximately 55% and approximately 80% water. This water concentration range represents a significant improvement over conventional systems (e.g., pressure and paddle screen devices), which typically provide fiber material at about 80% to about 92% water. In addition, if oil recovery is desired form the liquid medium, a desirable clean oil may be produced in the first zone 116A, which can be separated out using known technique, with more of an oil emulsion being produced in the second zone 116B, which can be later broken up using known techniques.

The apparatus 100 further includes at least one optional baffle 160 that is circumferentially disposed about and secured to the shaft 132 at about the junction between the first and second zones 116A, 116B. Here, the baffle 160 is specifically situated adjacent the end of the auger 142 and the beginning of the paddles 146. The baffle 160 extends in a direction away from the shaft 132, is generally perpendicular to the screen 102, and includes an outer surface that is spaced apart therefrom. The gap between the baffle 160 and the screen 102 can be adjusted, as desired. In one example, the gap can range from about ⅛ (0.32 cm) inch to about 1 inch (2.54 cm). The baffle 160 helps to control compaction in the first zone 116A and the amount of liquid medium that can be moved from the first to the second zone 116A, 116B, despite the size of the openings 104 in the screen 102. It is contemplated that with three or more zones, additional baffles 160 may be circumferentially disposed about and secured to the shaft 132 at about the junction between the additional zone and its adjacent zone. For example, in a three zone arrangement (not shown), baffles 160 could be situated between the first and second zones 116A, 116B and between the second zone 116B and third zone, with the second zone 116B being situated intermediate the first zone 116A and third zone.

With further reference to FIG. 3, at least one removable access panel 162, which is situated on the top side of the side wall 122 of the housing 106, may be provided for accessing the interior of the apparatus 100. In addition, one or more external valves 164 may be situated on the underside of the side wall 122 of the housing 106 so that the filtered liquid medium from the first zone 116A, for example, may be obtained and analyzed/tested, such as for starch and protein concentrations.

The apparatus 100 may have a length to diameter (L/D) ratio greater than two. In one embodiment, the apparatus 100 may have a L/D ratio between approximately 2 and 10, and more preferably between 4 and 6. These values are exemplary and those of ordinary skill in the art will recognize other ratios suitable for a particular application.

Operation of the apparatus 100 will now be described. To facilitate understanding of various aspects of the invention, operation of the apparatus 100 will be described in the context of fiber filtration in a corn wet mill process. It should be appreciated, however, that the apparatus 100 may be used in a wide range of applications, including grain wet or dry mills, and is not limited in use to either the corn wet mill or dry mill process described herein.

With reference again to FIG. 3, the motor 152 is activated so as to initiate rotation of the shaft 132 at its designated speed, as described above. The slurry is supplied to the tangential feed inlet 118 so as to flow into the interior of the screen 102 of the first screen section 102A that generally corresponds with the first zone 116A and which includes the auger 142. In one example, the linear velocity at which the medium and material is introduced into the apparatus 100 can be the same, or close to the same, as the tangential linear velocity of the first conveyor section 134A, e.g., the auger 142, at the surface of the first screen section 102A so as to conserve on power consumption and maximize separation of the medium and material. To help control the linear velocity at which the medium and material is introduced into the apparatus 100, the feed inlet 118 or a portion thereof can be tailored to, or may be adjustable, so that the feed inlet 118 or a portion thereof has a desired shape or size, e.g., diameter. The desired size or shape of the feed inlet 118, such as the size of the opening, for example, can be dependent upon the feed rate and/or feed pressure of the medium and material.

The concavity of the end of the shaft 132 adjacent the opening of the feed inlet 118 helps direct the slurry into the apparatus 100 between the auger 142 and first screen section 102A and the open cavities between the vanes 136, as wash water is also directed therein via the outlets 158 on the shaft 132. The wash water effectively pre-washes the fiber. Due to the rotation of the shaft 132 and, thus, the vanes 136 and the accompanying ribbon flight 140, the slurry is directed radially toward the first screen section 102A, which corresponds with the first zone 116A, to filter the material from the liquid medium as well as moved along the length of the first screen section 102A. Fiber is filtered from the slurry by allowing the water, starch, gluten, and other relatively small constituents of the slurry to pass through the first screen section 102A and drain into the first hopper 126A, which is situated in the first zone 116A, while the fiber and relatively large constituents of the slurry are retained in the apparatus 100.

The fiber eventually pushes its way through the gap between the baffle 160 and the first screen section 102A and into the interior of the second screen section 102B, which corresponds with the second zone 116B, for washing/dewatering via the paddles 146. Here, wash water is also directed therein via the outlets 158 on the shaft 132. Due to the rotation of the paddles 146, the fiber is directed radially towards the second screen section 102B, which corresponds with the second zone 116B, as well as moved along the length of the second screen section 102B so that the fiber is further dewatered and filtered from the liquid medium. This process allows any additional water, starch, gluten, and other relatively small constituents of the slurry to pass through the second screen section 102B and drain into the second hopper 126B situated in the second zone 116B, while the fiber makes its way towards the discharge chute 120. The concavity of the end of the shaft 132 adjacent the discharge chute 120 helps direct the de-watered fiber therein. At the end of second zone 116B, the fiber has been sufficiently concentrated. For example, in one embodiment, the fiber may be between about 55% and about 80% water at the end of the second zone 116B.

The washed and filtered fiber exits via the discharge chute 120. When the fiber exits the chute 120, the fiber may be transported to a remote site and further processed to result in a desired product. Moreover, the slurry that passes through the screen 102, as well any wash water, starch and/or gluten, may be further processed, such as according to the corn wet milling process as described above in FIG. 1.

The various features of the apparatus 100 culminate in a synergistic effect. For example, one or more of the features allow the apparatus 100 to be a single, self-contained device that performs both the initial pre-washing of the fiber and filtering of the liquid medium to remove the desired filtered material, and additional washing/dewatering of the material to remove additional constituents, such as additional starch and/or gluten, therefrom. The present apparatus 100 can also reduce the capital costs of the device, the labor and associated costs for maintaining the device, and the operating costs (e.g., use less water, etc.).

One or more of the features of the apparatus 100 also allow the dewatered material to exit the centrifuge in a dryer condition as compared to existing filtration systems. For example, the apparatus 100 may provide the filtered material at a water concentration of between about 55% and about 80% water, which can be a significant reduction compared to conventional filtration systems. Providing a dryer product results in less wash water required for a given purity level of fiber. Also, a dryer product may result in additional benefits. For example, in many cases, in the corn wet milling process, the fiber collected in filtration systems are further processed by directing the fiber through a press to squeeze additional water from the fiber, and then directing the fiber through a dryer. The various apparatuses that press the fiber are expensive and costly to maintain and operate. Additionally, energy costs associated with operation of the dryer are also expensive.

Figure 4:
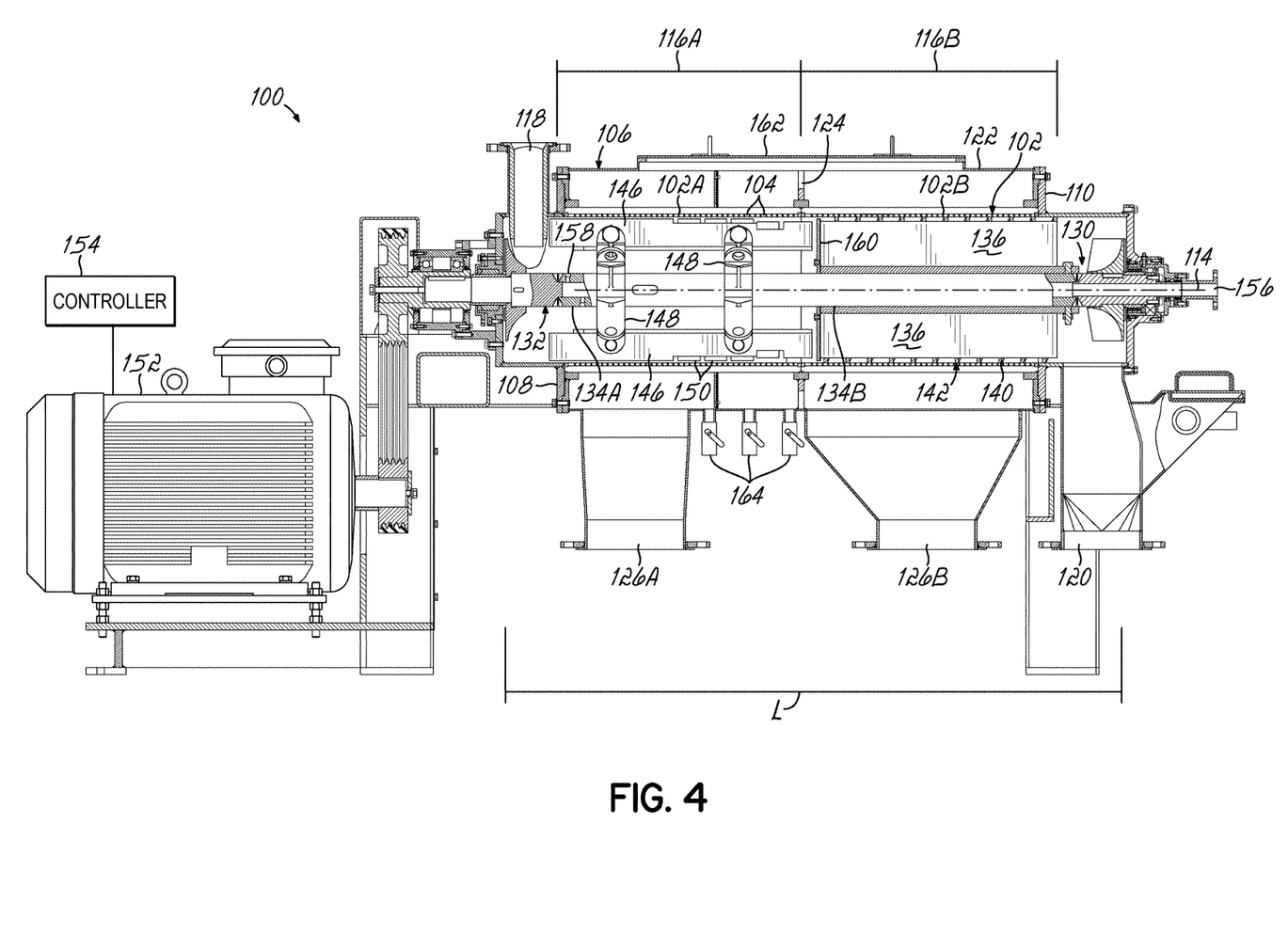
FIG. 4 is a cross-sectional view of a multi-zoned screening apparatus in accordance with another embodiment of the invention.
Figure 5:
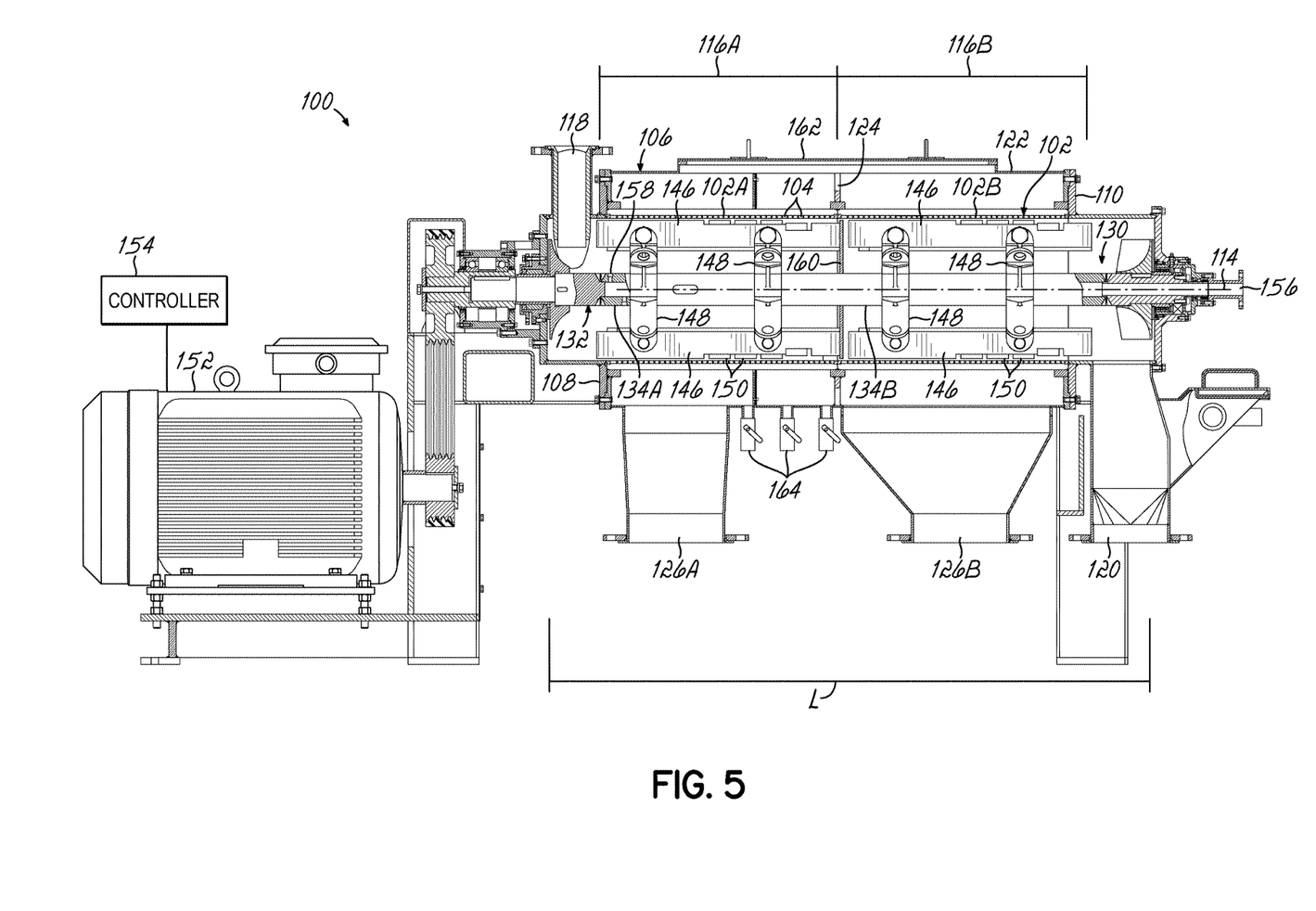
FIG. 5 is cross-sectional view of a multi-zoned screening apparatus in accordance with another embodiment of the invention.
Figure 6:
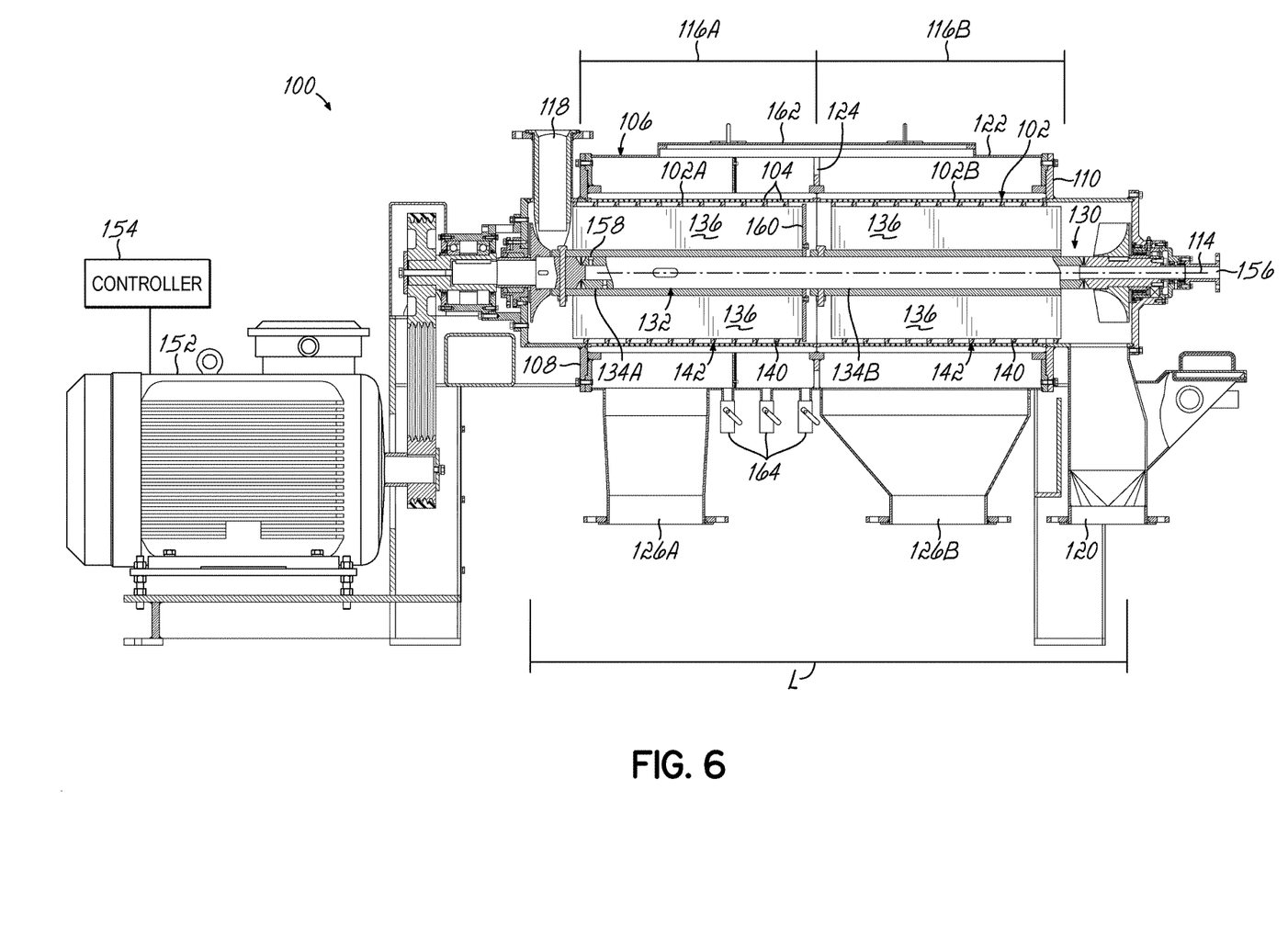
FIG. 6 is a cross-sectional view of a multi-zoned screening apparatus in accordance with another embodiment of the invention.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. For example, as shown in FIG. 4, the first conveyor section 134A can include the plurality of paddles 146 connected to the shaft 132 via a plurality of spaced apart support arms 148 and the second conveyor section 134B can include the auger 142. In yet another embodiment, as shown in FIG. 5, both the first conveyor section 134A and second conveyor section 134B can include the plurality of paddles 146 connected to the shaft 132 via a plurality of spaced apart support arms 148. In one example, the openings 104 in the first screen section 102A may be larger here than the openings in the second screen section 102B. In still another embodiment, as shown in FIG. 6, both the first conveyor section 134A and second conveyor section 134B can include the auger 142. In one example, the openings 104 in the first screen section 102A may be larger here than the openings in the second screen section 102B. In addition, although not shown, in one example, the first and second conveyor sections 134A, 134B can define a single elongated auger or a plurality of paddles extending generally along the length of the apparatus 100 so as to generally correspond with the first and second zones 116A, 116B. And other various combinations and arrangements are contemplated where more than the two zones 116A, 116B are provided.

In addition, while the apparatus 100 has been described herein as being in a generally horizontal orientation, other orientations are possible, including the apparatus 100 having a generally vertical orientation. Additionally, the apparatus 100 may be an open type of system and may also be designed for pressurized operation. Still further, the apparatus 100 may be operated continuously or configured to work in a batch mode of operation. Furthermore, those of ordinary skill in the art should recognize that the number of zones may be selected based on the specific application.

In addition to the above, the apparatus 100 as described above may be found beneficial in other industrial applications. By way of example, the chemical industry utilizes a crystal formation process wherein it is desirable to bring in a bulk material, separate out the crystals contained therein, and then wash the crystals. The apparatus 100 as described herein may be used for such a process to achieve the results in a single device. Moreover, the juice industry similarly includes various processes wherein a bulk material is brought in and filtered. It may be desirable to wash the fruit or other bulk material as well. Again, the apparatus 100 as described herein may be used in such applications. Moreover, other corn or grain milling processes may benefit from filtration disclosed herein. Additionally, other industries that seek to filter a material from a medium (e.g., liquid medium or otherwise) and/or wash the material may also benefit from the screening apparatus as described herein.

While the corn wet mill process and dry mill process typically utilize pressure or paddle screen devices and the advantages of the apparatus 100 relative to these devices has been noted above, the apparatus 100 described herein may also provide benefits to industries that utilize other types of filtration systems. For examples, some industries utilize decanter centrifuges and/or conic screen bowl centrifuges. Nevertheless, these centrifuges also have drawbacks which may be addressed by the apparatus 100 disclosed herein. By way of example, decanter centrifuges have no washing zone and therefore separate devices must be used if washing the filtered material is desired. Of course these additional devices are costly and take up space within the manufacturing facility. Additionally, the apparatus 100 described herein are able to provide a filtered material in a dryer state as compared to the output of a decanter centrifuge. As noted above, providing a dryer material may significantly reduce the energy costs associated with post processing of the material. Similarly, conic screen bowl centrifuges do not provide for washing of the filtered material.

Those of ordinary skill in the art will recognize how to modify or configure the apparatus 100 so as to effectively operate in these other industries. Thus, the various features of the invention may be used alone or in numerous combinations depending on the needs and preferences of the user.

What is claimed is:

1. A multi-zoned screening apparatus comprising:
   an elongated housing that is compartmentalized and separated into at least a first zone and a second zone, the first zone and second zone situated directly adjacent one another along a length of the housing, with each zone having a corresponding outlet;
   an elongated cylindrical screen having a plurality of openings, the screen being immovable and situated lengthwise within the housing to generally align with the first and second zones, each of the first and second zones configured to collect a liquid medium that passes through the plurality of openings;
   a conveyor situated lengthwise within the screen, the conveyor including an elongated shaft having at least a first conveyor section and a second conveyor section along a length of the conveyor, the first conveyor section generally aligns with the first zone of the housing and the second conveyor section generally aligns with the second zone of the housing, wherein the conveyor rotates relative to the immovable screen to direct the liquid medium and a material toward the screen to filter the material from the liquid medium;
   at least one feed inlet in fluid communication with an interior of the screen that aligns with the first zone of the housing to supply the liquid medium and the material to the multi-zoned screening apparatus; and
   a discharge chute that collects the filtered material from the multi-zoned screening apparatus.

2. The multi-zoned screening apparatus of claim 1, wherein the elongated housing includes at least one movable interior panel that compartmentalizes and separates the housing into the first zone and second zone.

3. The multi-zoned screening apparatus of claim 1, wherein the screen includes a first screen section and a second screen section situated adjacent one another along the length of the screen, the first screen section generally aligns with the first zone and the second screen section generally aligns with the second zone, the first zone is configured to collect the liquid medium that passes through the plurality of openings in the first screen section and the second zone is configured to collect the liquid medium that passes through the plurality of openings in the second screen section.

4. The multi-zoned screening apparatus of claim 3, wherein the first conveyor section is configured to move the material along a length of the first screen section and the second conveyor section is configured to move the material along a length of the second screen section.

5. The multi-zoned screening apparatus of claim 3, wherein the at least one feed inlet is in fluid communication with an interior of the first screen section that aligns with the first zone of the housing to supply the liquid medium and the material to the multi-zoned screening apparatus.

6. The multi-zoned screening apparatus of claim 3, wherein the first screen section and second screen section each have openings therethrough, the openings in the first screen section being of a different size than those in the second screen section.

7. The multi-zoned screening apparatus of claim 1, further including a baffle that is circumferentially disposed about the elongated shaft at about a junction between the first and second zones of the housing, the baffle extends in a direction away from the elongated shaft and is spaced apart from the screen.

8. The multi-zoned screening apparatus of claim 1, wherein the discharge chute collects the filtered material from the second zone of the multi-zoned screening apparatus.

9. The multi-zoned screening apparatus of claim 1, wherein the first zone defines a pre-washing and separation zone for the material and liquid medium.

10. The multi-zoned screening apparatus of claim 9, wherein the second zone defines a washing and dewatering zone for the material.

11. The multi-zoned screening apparatus of claim 1 further comprising a liquid inlet in fluid communication with the interior of the screen that aligns with the first zone of the housing and/or an interior of the screen that aligns with the second zone of the housing to supply wash water to the multi-zoned screening apparatus.

12. A method of separating a material from a liquid medium utilizing the multi-zoned screening apparatus of claim 1.

13. A multi-zoned screening apparatus comprising:
   an elongated housing that is compartmentalized and separated into at least a first zone and a second zone, the first zone and second zone situated directly adjacent one another along a length of the housing, with each zone having a corresponding outlet;
   an elongated cylindrical screen having a plurality of openings, the screen being immovable and situated lengthwise within the housing to generally align with the first and second zones, each of the first and second zones configured to collect a liquid medium that passes through the plurality of openings;

a conveyor situated lengthwise within the screen, the conveyor including an elongated shaft having at least a first conveyor section and a second conveyor section along a length of the conveyor, the first conveyor section generally aligns with the first zone of the housing and the second conveyor section generally aligns with the second zone of the housing, the first conveyor section including a plurality of vanes and a ribbon flight helically winding about a length of an outer surface of the vanes and the second conveyor section including a plurality of paddles, wherein the conveyor rotates relative to the immovable screen to direct the liquid medium and a material toward the screen to filter the material from the liquid medium;

at least one feed inlet in fluid communication with an interior of the screen that aligns with the first zone of the housing to supply the liquid medium and the material to the multi-zoned screening apparatus; and a discharge chute that collects the filtered material from the multi-zoned screening apparatus.

14. The multi-zoned screening apparatus of claim 13, wherein the elongated housing includes at least one movable interior panel that compartmentalizes and separates the housing into the first zone and second zone.

15. The multi-zoned screening apparatus of claim 13, wherein the screen includes a first screen section and a second screen section situated adjacent one another along the length of the screen, the first screen section generally aligns with the first zone and the second screen section generally aligns with the second zone, the first zone configured to collect the liquid medium that passes through the plurality of openings in the first screen section and the second zone configured to collect the liquid medium that passes through the plurality of openings in the second screen section.

16. The multi-zoned screening apparatus of claim 15, wherein the first conveyor section is configured to move the material along a length of the first screen section and the second conveyor section is configured to move the material along a length of the second screen section.

17. The multi-zoned screening apparatus of claim 15, wherein the at least one feed inlet is in fluid communication with an interior of the first screen section that aligns with the first zone of the housing to supply the liquid medium and the material to the multi-zoned screening apparatus.

18. The multi-zoned screening apparatus of claim 15, wherein the first screen section and second screen section each have openings therethrough, the openings in the first screen section being of a different size than those in the second screen section.

19. The multi-zoned screening apparatus of claim 13, further including a baffle that is circumferentially disposed about the elongated shaft at about a junction between the first and second zones of the housing, the baffle extends in a direction away from the elongated shaft and is spaced apart from the screen.

20. The multi-zoned screening apparatus of claim 13, wherein the discharge chute collects the filtered material from the second zone of the multi-zoned screening apparatus.

21. The multi-zoned screening apparatus of claim 13, wherein the first zone defines a pre-washing and separation zone for the material and liquid medium.

22. The multi-zoned screening apparatus of claim 21, wherein the second zone defines a washing and dewatering zone for the material.

23. The multi-zoned screening apparatus of claim 13 further comprising a liquid inlet in fluid communication with the interior of the screen that aligns with the first zone of the housing and/or an interior of the screen that aligns with the second zone of the housing to supply wash water to the multi-zoned screening apparatus.

24. A method of separating a material from a liquid medium utilizing the multi-zoned screening apparatus of claim 13.

* * * * *